(12) United States Patent
Walker et al.

(10) Patent No.: US 11,724,660 B1
(45) Date of Patent: Aug. 15, 2023

(54) AIRBAG AND AIRBAG MODULE

(71) Applicant: Toyoda Gosei Co., Ltd., Kiyosu (JP)

(72) Inventors: David O Walker, Belleville, MI (US); Benny Dale Cantrell, Jr., Ypsilanti, MI (US); Ryosuke Jinnai, Novi, MI (US)

(73) Assignee: Toyoda Gosei Co., Ltd., Kiyosu (JP)

( * ) Notice: Subject to any disclaimer, the term of this patent is extended or adjusted under 35 U.S.C. 154(b) by 0 days.

(21) Appl. No.: 17/835,469

(22) Filed: Jun. 8, 2022

(51) Int. Cl.
*B60R 21/231* (2011.01)
*B60R 21/207* (2006.01)

(52) U.S. Cl.
CPC ...... *B60R 21/23138* (2013.01); *B60R 21/207* (2013.01); *B60R 2021/23146* (2013.01)

(58) Field of Classification Search
None
See application file for complete search history.

(56) References Cited

U.S. PATENT DOCUMENTS

| | | | | |
|---|---|---|---|---|
| 5,918,898 A | * | 7/1999 | Wallner | B60R 21/26 280/740 |
| 7,644,950 B2 | * | 1/2010 | Kloss | B60R 21/261 280/740 |
| 8,408,582 B2 | * | 4/2013 | Lunt | B60R 21/231 280/742 |
| 9,108,589 B2 | * | 8/2015 | Rickenbach | B60R 21/23138 |
| 9,592,788 B2 | | 3/2017 | Wiik et al. | |
| 9,663,061 B2 | | 5/2017 | Mihm | |

* cited by examiner

*Primary Examiner* — Faye M Fleming
(74) *Attorney, Agent, or Firm* — Christopher G. Darrow; Darrow Mustafa PC

(57) ABSTRACT

An airbag module includes an airbag, an inflator, and a mounting retainer. The airbag includes an inflation chamber, an inflation port for the inflation chamber, and a neck that opens into the inflation chamber around the inflation port. The airbag further includes a pocket. The pocket is located on the neck and opens away from the neck and the inflation port. The inflator is configured to be inserted into the neck and inflate the inflation chamber through the inflation port. The mounting retainer is configured to be installed to the neck in the pocket, receive and support the inflator, and mount the airbag to a vehicle.

20 Claims, 7 Drawing Sheets

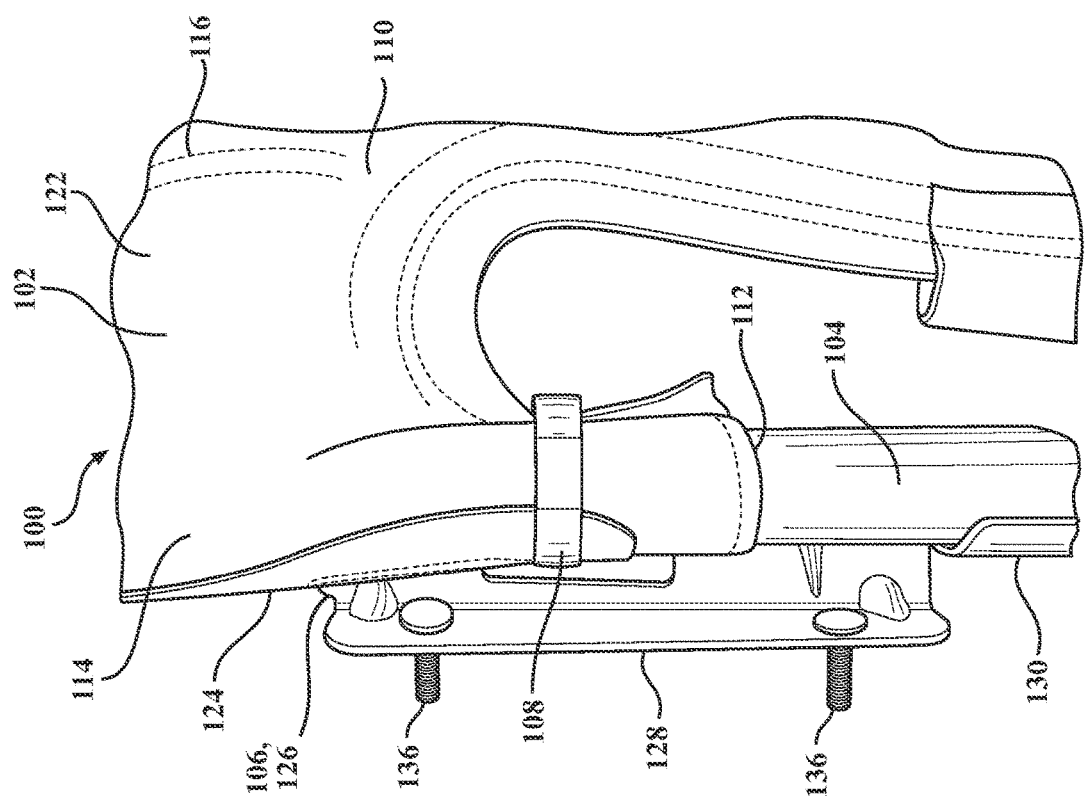
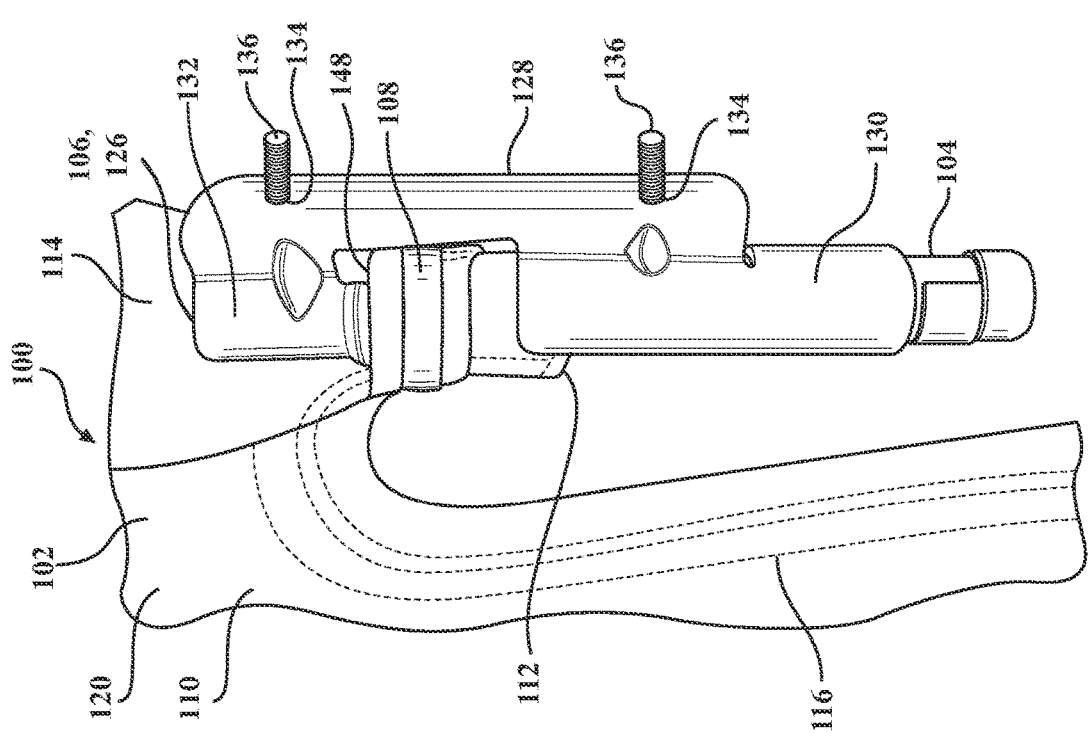

US 11,724,660 B1

AIRBAG AND AIRBAG MODULE

TECHNICAL FIELD

The embodiments disclosed herein relate to vehicles equipped with airbags and, more particularly, to airbags and airbag modules for far-side airbags.

BACKGROUND

Airbags are standard equipment on many new vehicles. For instance, many new vehicles are equipped with airbag modules for far-side airbags. As part of the airbag modules, the vehicles may include a mounting retainer for mounting the airbag to the vehicle, and an inflator for inflating the airbag upon impact.

SUMMARY

Disclosed herein are embodiments of an airbag and an airbag module.

In one aspect, an airbag module includes an airbag, an inflator, and a mounting retainer. The airbag includes an inflation chamber, an inflation port for the inflation chamber, and a neck that opens into the inflation chamber around the inflation port. The airbag further includes a pocket. The pocket is located on the neck and opens away from the neck and the inflation port. The inflator is configured to be inserted into the neck and inflate the inflation chamber through the inflation port. The mounting retainer is configured to be installed to the neck in the pocket, receive and support the inflator, and mount the airbag to a vehicle at one or more mounting points.

In another aspect, an airbag includes an inflation chamber and a pocket. With respect to the inflation chamber, the airbag includes an inflation port for the inflation chamber and a neck that opens into the inflation chamber around the inflation port. The pocket is located on the neck and opens away from the neck and the inflation port. The pocket is configured to receive a mounting retainer for mounting the airbag to a vehicle.

In yet another aspect, a method of assembling an airbag module is disclosed. The airbag module includes an airbag including an inflation chamber, an inflation port for the inflation chamber, and a neck that opens into the inflation chamber around the inflation port. The airbag also includes a pocket located on the neck and opening away from the neck and the inflation port. The airbag module also includes an inflator configured to be inserted into the neck and inflate the inflation chamber through the inflation port. The airbag module further includes a mounting retainer configured to be installed to the neck in the pocket, receive and support the inflator, and mount the airbag to a vehicle. The method includes installing the inflator to the neck through the inflation port and to the mounting retainer. The method also includes installing the mounting retainer to the pocket. The method further includes installing the clamp around the inflator, the mounting retainer, and the pocket to secure the airbag to the mounting retainer.

These and other aspects will be described in additional detail below.

BRIEF DESCRIPTION OF THE DRAWINGS

The various features, advantages and other uses of the present embodiments will become more apparent by referring to the following detailed description and drawing in which:

FIG. 4A is a front view of a portion of the airbag module showing the clamp installed around the mounting retainer, the inflator, and a neck of the airbag.

FIG. 4B is a rear view of a portion of the airbag module showing the clamp installed around the mounting retainer, the inflator, and a neck of the airbag.

DETAILED DESCRIPTION

This disclosure teaches an airbag and an airbag module. The airbag may be a far-side airbag and the airbag module may include a far-side airbag. The airbag includes an inflation chamber, an inflation port for the inflation chamber, and a neck that opens into the inflation chamber around the inflation port. The airbag also includes a pocket located on the neck that opens away from the neck and the inflation port. The inflator is configured to be inserted into the neck and inflate the inflation chamber through the inflation port. The mounting retainer is configured to be installed to the neck in the pocket, receive and support the inflator, and mount the airbag to a vehicle. The airbag module also includes a clamp configured to secure the inflator, the mounting retainer, and the airbag around the pocket. In some instances, forces applied to the components of the airbag module during inflation may cause the airbag to experience a pulling force tending to pull the airbag away from the mounting retainer, the inflator, and/or the clamp. Engagement between the mounting retainer and the pocket may help withstand the pulling force and thereby increase the factor of safety with respect to preventing the airbag from pulling away from the mounting retainer, the inflator, and/or the clamp, especially during inflation or deployment of the airbag.

Figure 1:
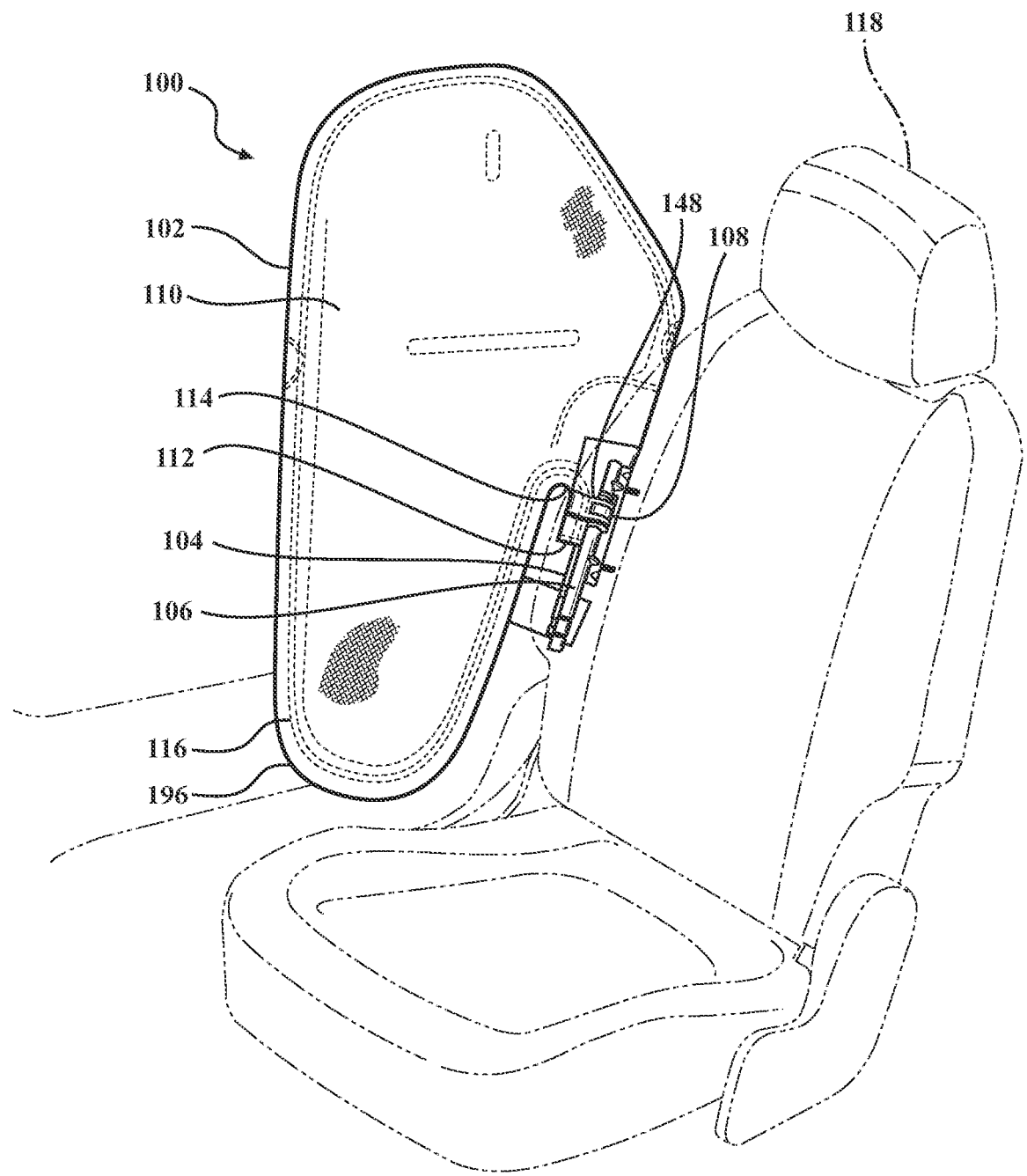
FIG. 1 is an example of an airbag module attached to a vehicle seat and including an airbag with a pocket, an inflator, a mounting retainer, and a clamp.

Referring now to FIG. 1, an example of an airbag module 100 for a vehicle is shown. The airbag module 100 includes an airbag 102, an inflator 104 for inflating the airbag 102, a mounting retainer 106 for mounting the airbag module 100 to one or more interior components of a vehicle, and a clamp 108 for securing the airbag 102 and the inflator 104 to the mounting retainer 106. The airbag 102 includes an inflation chamber 110, an inflation port 112 for the inflation chamber 110, a tubular neck 114 for the inflator 104 that opens into the inflation chamber 110 around the inflation port 112, and a bordering area 116 around the inflation chamber 110 and the neck 114. Although the airbag 102, as shown, includes one inflation chamber 110, one inflation port 112, and one neck 114, it will be understood that this disclosure is applicable in principle to an otherwise similar airbag module 100 whose airbag 102 includes multiple inflation chambers 110 and/or multiple inflation ports 112 and multiple necks 114. Likewise, although the airbag module 100, as shown, includes one inflator 104, one mounting retainer 106, and one clamp 108, it will be understood that this disclosure is applicable in principle to an otherwise similar airbag module 100 including multiple inflators 104, multiple mounting retainers 106, and multiple clamps 108. Although the airbag 102, as shown, can be a far-side airbag (FSAB), also known as a center-side airbag (CSAB), it will be understood that this disclosure is applicable in principle to an otherwise similar airbag module for a side curtain airbag or other curtain-type airbag. The airbag module 100 may serve as a passive collision mitigation system for passengers in a passenger compartment of the vehicle. Specifically, the airbag module 100 principally functions when the vehicle experiences a side impact, rollover, and/or other collision event. In response to a collision event, the inflator 104 is operable to inflate the airbag 102. The airbag 102, acting against the mounting retainer 106 and the vehicle through the mounting retainer 106, is thereby induced to expand from a packaged configuration to a deployed configuration. Moreover, the airbag module 100, although shown attached to a vehicle seat 118, can be attached to any suitable interior component or components of the vehicle, for example, an A-pillar, a B-pillar, a roof rail, etc.

Figure 2A:
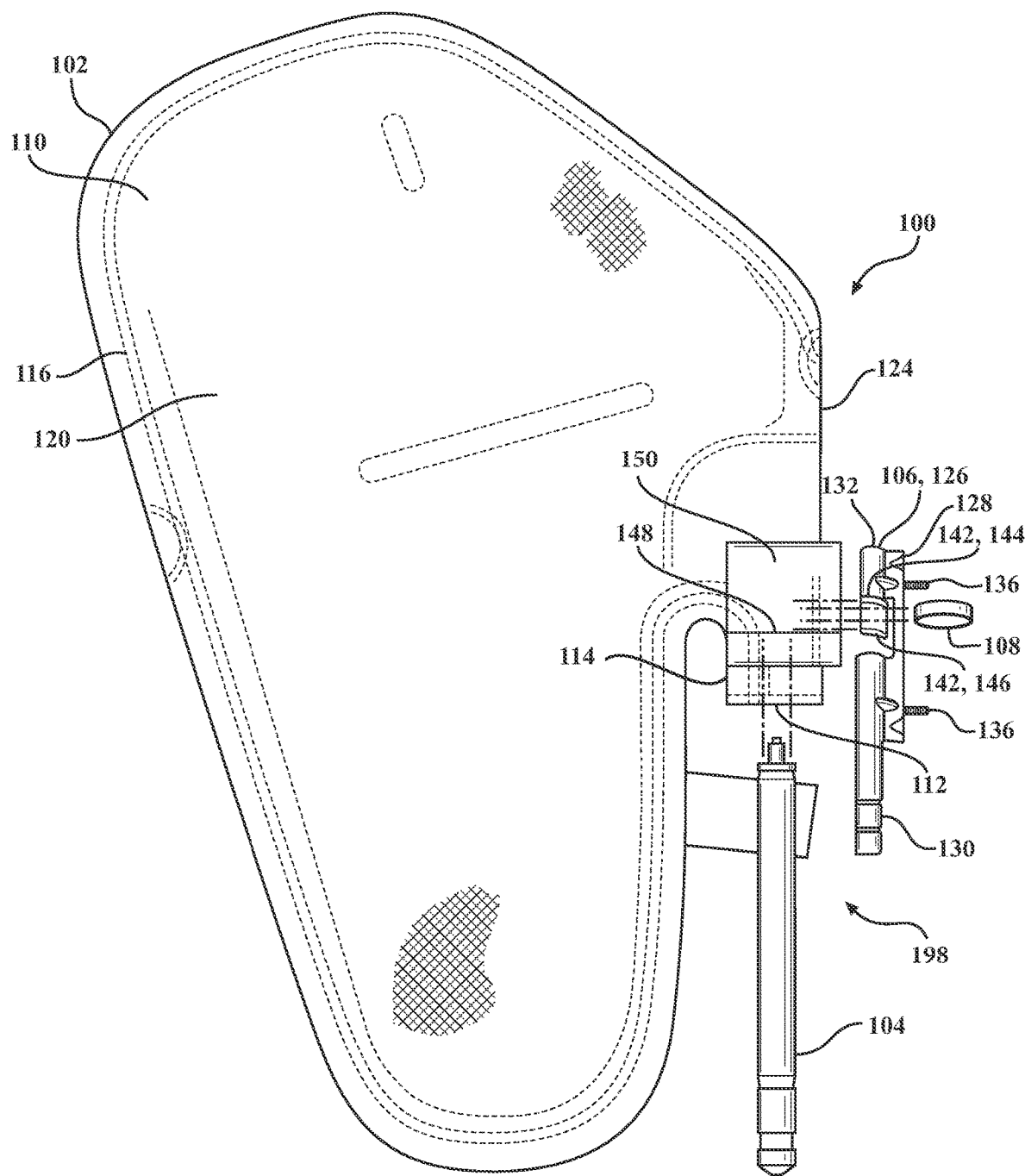
FIG. 2A is a front view of the airbag module in a disassembled configuration.
Figure 2B:
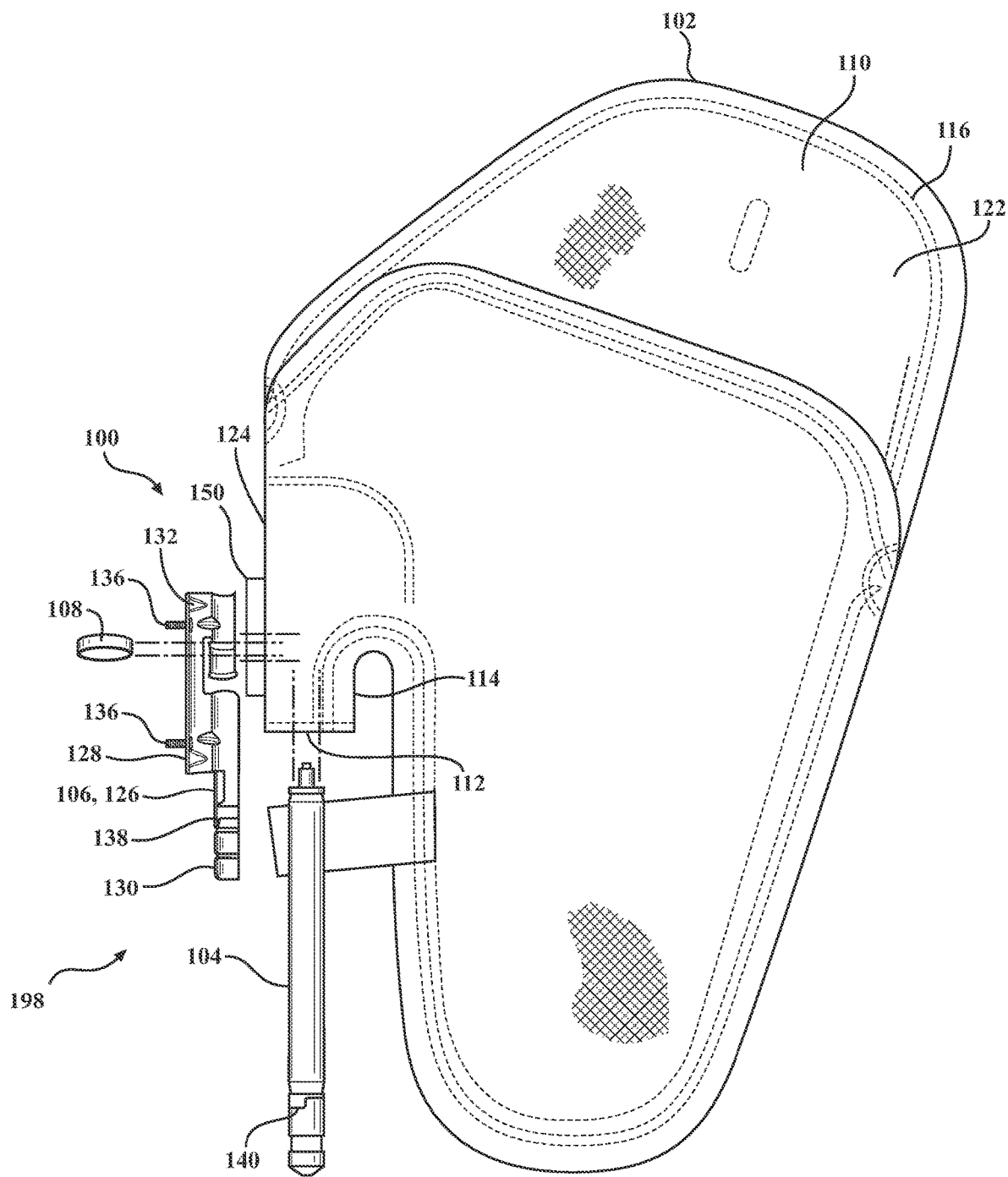
FIG. 2B is a rear view of the airbag module in a disassembled configuration.

The airbag 102 is made from one or more materials suitable for its construction, arrangement in the packaged configuration, mounting to the vehicle, inflation-induced expansion to the deployed configuration, and mitigation of collision forces experienced by passengers. For instance, the airbag 102 may be made from one or more flexible, durable, and impermeable or semi-impermeable fabrics, such as fabrics woven from polyamide, polyamide blends, polyester, polyester blends, and the like. In a double-layer implementation, the airbag 102 includes a first layer 120 and a second layer 122. In the implementation shown in FIGS. 1, 2A, and 2B, the first layer 120 and the second layer 122 are unitarily formed in a butterfly-like configuration, which is then folded along a folding edge 124, attached at the bordering area 116, and left unconnected at the inflation chamber 110 and the neck 114. As shown, the first layer 120 and the second layer 122 are sewn together at the bordering area 116. In other implementations, the first layer 120 and the second layer 122 may be sewn, adhered, welded, unitarily formed, and/or otherwise connected with one another at the bordering area 116, and left unconnected from one another at the inflation chamber 110 and the neck 114, in any suitable configuration.

The inflator 104 and the inflation port 112 may be sealed with one another. The inflator 104 is inserted into the neck 114 through the inflation port 112. The inflator 104 is operable to inflate the airbag 102 by introducing inflation gas to the inflation chamber 110 through the inflation port 112. With additional reference to FIGS. 2A, 2B, 3A, and 3B, the mounting retainer 106 is configured to be installed to the neck 114 and includes a rounded, elongate body 126 configured to receive and support the inflator 104, and a mounting bracket 128 configured to mount the remainder of the mounting retainer 106 to the vehicle. The inflator 104 may be configured to rest in or otherwise against the mounting retainer 106 at the body 126. Additionally, the inflator 104 may be connected to the mounting retainer 106 at the body 126. The body 126 includes a first portion 130 and a second portion 132, and the mounting bracket 128 includes one or more apertures 134 configured to receive connectors 136 used to connect the mounting bracket 128 to the vehicle. With the installation of the mounting retainer 106 to the neck 114, the first portion 130 extends from the neck 114 and the second portion 132 extends along the neck 114. The first portion 130 and the second portion 132 are configured to receive and support the inflator 104. The first portion 130 may include a mounting tab 138 and the inflator 104 may define an indentation 140 configured to be aligned with the mounting tab 138 to keep the inflator 104 in place within the mounting retainer 106. With additional reference to FIGS. 4A and 4B, the second portion 132 is configured to be secured to the airbag 102 by the clamp 108. Accordingly, the second portion 132 includes flanges 142 (for example, a first flange 144 and a second flange 146) and the clamp 108 is configured to secure the airbag 102 at the neck 114 to the mounting retainer 106 at the second portion 132 between the flanges 142. In some instances, the clamp 108 can be an Oetiker clamp, or the clamp 108 can be any other suitable type of clamp.

The airbag 102 also includes a pocket 148 for the mounting retainer 106 on the neck 114. In some arrangements, the pocket 148 may be fully closed-bottomed. In other arrangements, the pocket 148 may have one or more small bottom holes serving as "peep hole" assembly aids during the production of the airbag module 100. From its location on the neck 114, the pocket 148 opens away from the neck 114 and the inflation port 112. For example, the pocket 148 may open substantially opposite from the neck 114 and the inflation port 112. As part of the installation of the mounting retainer 106 to the neck 114, the pocket 148 is configured to receive the second portion 132 of the mounting retainer 106 in order to help secure the airbag 102 to the mounting retainer 106. In some instances, during use of the airbag module 100, forces applied to the components of the airbag module 100 during inflation may cause the airbag 102 to experience a pulling force tending to pull the airbag 102 away from the mounting retainer 106, the inflator 104, and/or the clamp 108. More specifically, when the airbag 102 is inflated, the neck 114 may experience the pulling force against the clamp 108 and the mounting retainer 106 in an axial direction along the inflator 104 towards the second portion 132 of the mounting retainer 106. As noted above, the clamp 108 is configured to secure the neck 114 to the second portion 132. Together with the engagement between the clamp 108 and the neck 114, the engagement between the second portion 132 and the pocket 148 may help withstand the pulling force and thereby increase the factor of safety with respect to preventing the airbag 102 from pulling away from the mounting retainer 106, the inflator 104, and/or the clamp 108. Compared to the engagement between the clamp 108 and the neck 114, the additional engagement between the second portion 132 and the pocket 148 has proven in testing to withstand an approximately 75% higher pulling force.

Figure 5A:
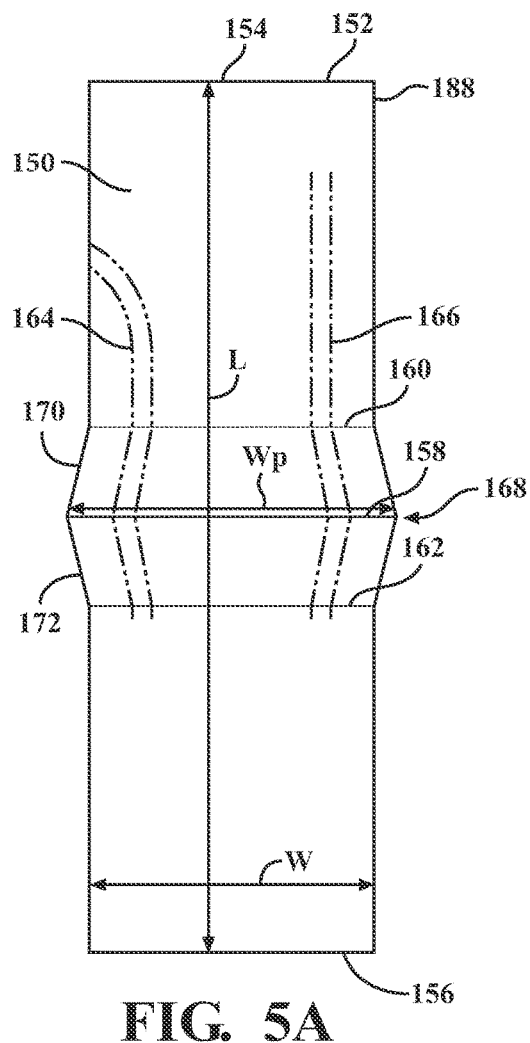
FIG. 5A is an example of a first embodiment of a pocket piece for the airbag module in an unfolded configuration.
Figure 5B:
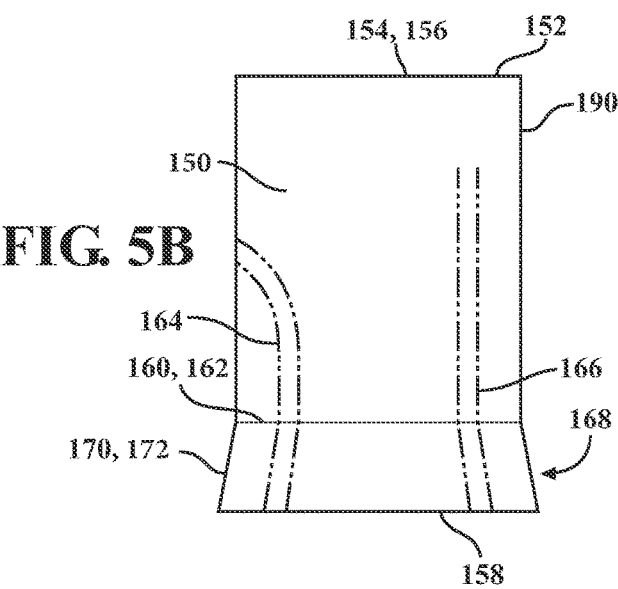
FIG. 5B is an example of the first embodiment of the pocket piece in a first partially folded configuration.
Figure 5C:
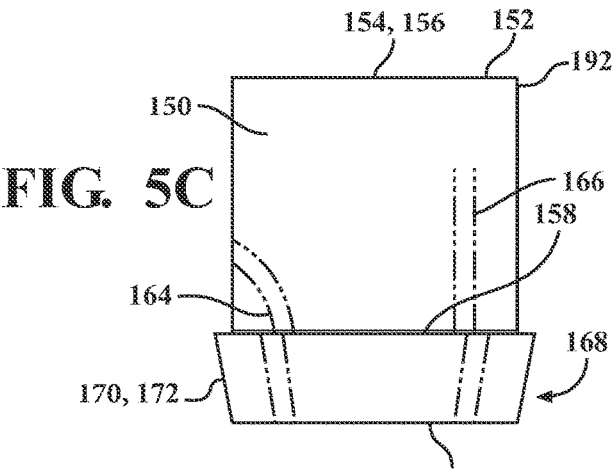
FIG. 5C is an example of the first embodiment of the pocket piece in a second partially folded configuration.
Figure 5D:
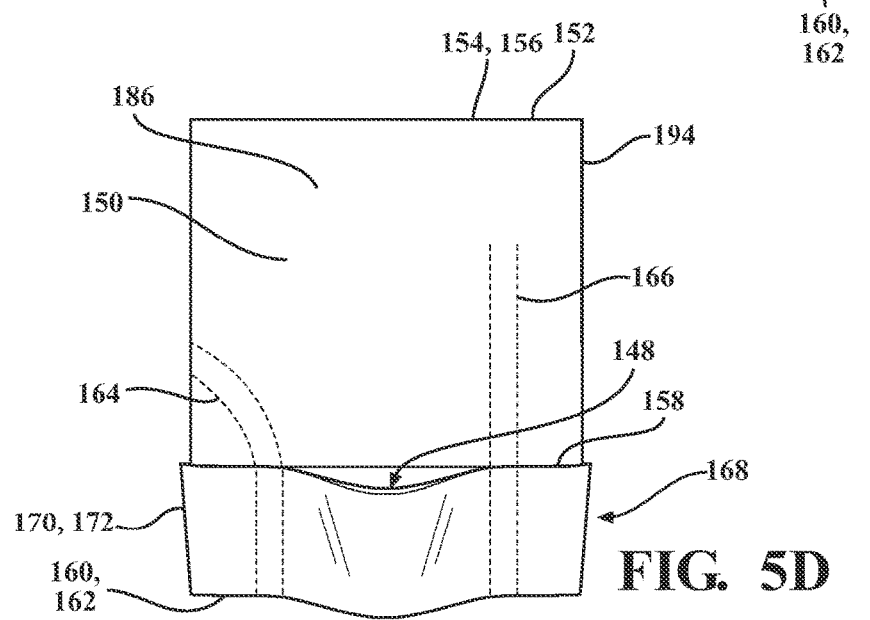
FIG. 5D is an example of the first embodiment of the pocket piece in a folded configuration.
Figure 6A:
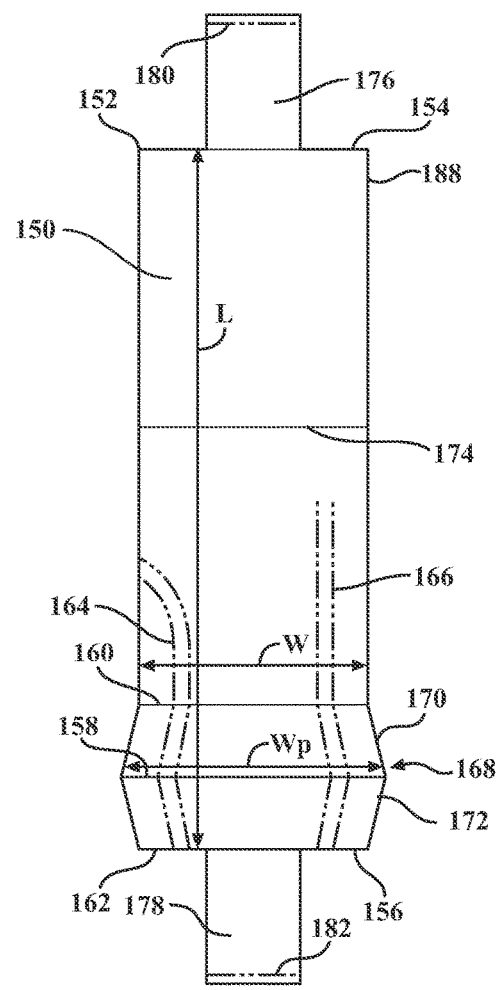
FIG. 6A is an example of a second embodiment of a pocket piece for the airbag module in an unfolded configuration.

The pocket 148 may be integrated to the remainder of the airbag 102, for example, unitarily formed with the neck 114 from the first layer 120 and/or the second layer 122, or may be formed from a separate pocket piece 150 and attached to the neck 114 as shown. As shown, the pocket piece 150 is sewn to the neck 114, however, the pocket piece 150 could additionally or alternatively be adhered and/or welded to the neck 114. Referring to FIGS. 5A-5D and 6A-6D, the pocket piece 150 may be formed using a strip 152 of fabric, folded to form the pocket 148, and attached to the neck 114 in any suitable manner. FIGS. 5A and 6A show various embodiments of the strip 152 in an unfolded configuration 188. The strip 152 may be made using the same material as the airbag 102 or may be made from a different, high-strength material. The strip 152 has an elongated shape defining a length L, a width W, a first end 154, and a second end 156 opposite the first end 154. The strip 152 also includes fold lines extending laterally across the strip 152 and indicating where the strip 152 is folded to create the pocket 148. The fold lines include a pocket edge fold line 158, a first pocket base fold line 160, and a second pocket base fold line 162. When the strip 152 is folded, the pocket edge fold line 158 forms a mouth of the pocket 148, and the two pocket 148 base fold lines form a bottom of the pocket 148. The first pocket base fold line 160 and the second pocket base fold line 162 are located on either side of the pocket edge fold line 158 equidistant from the pocket edge fold line 158. The distance between the pocket edge fold line 158 and the first pocket base fold line 160 or the second pocket base fold line 162 may determine the depth of the pocket 148.

The strip 152 also includes a projection 168, which is a wider portion of the strip 152 between the first pocket base fold line 160 and the second pocket base fold line 162. The projection 168 includes extra fabric such that when the pocket piece 150 is formed, the extra material creates the three-dimensional mouth of the pocket 148. At the first pocket base fold line 160 and the second pocket base fold line 162, as mentioned above, the strip 152 has a width W. At the pocket edge fold line 158, the projection 168 has a width $W_p$, which is wider than the width W. Accordingly, the projection 168 includes first angled edges 170 extending between the first pocket base fold line 160 and the pocket edge fold line 158, and second angled edges 172 extending between the second pocket base fold line 162 and the pocket edge fold line 158.

The strip 152 also includes attachment lines extending longitudinally along the strip 152 and indicating where the pocket piece 150 is attached to the airbag 102. The attachment lines include a first attachment line 164 and a second attachment line 166. Within the projection 168 (e.g. between the first pocket base fold line 160 and the second pocket base fold line 162), the attachment lines may be angled similarly to the first angled edges 170 and the second angled edges 172. Outside of the projection 168, the first attachment line 164 may generally follow the bordering area 116, and the second attachment line 166 may generally follow the folding edge 124. When the strip 152 is folded along the pocket edge fold line 158, the first pocket base fold line 160, and the second pocket base fold line 162 to create the pocket 148, the first attachment line 164 and the second attachment line 166 within the projection 168 may be aligned with and attached to the first attachment line 164 and the second attachment line 166 outside of the projection 168. Doing so causes the fabric between the first attachment line 164 and the second attachment line 166 within the projection 168 to form the three-dimensional mouth of the pocket 148.

To create the pocket 148, in a first embodiment, the strip 152 may be folded along the pocket edge fold line 158 so that the first pocket base fold line 160 and the second pocket base fold line 162, as well as the first angled edges 170 and the second angled edges 172, align. FIG. 5B shows the strip 152 in a first partially folded configuration 190, in which the strip 152 is folded along the pocket edge fold line 158. The strip 152 can then be folded along the first pocket base fold line 160 and the second pocket base fold line 162. FIG. 5C shows the strip 152 in a second partially folded configuration 192, in which the strip 152 is folded along the first pocket base fold line 160 and the second pocket base fold line 162. After manipulation to align the first attachment line 164 and the second attachment line 166 within the projection 168 with the first attachment line 164 and the second attachment line 166 outside of the projection 168, the strip 152 may then be sewn or otherwise connected at the first attachment line 164 and the second attachment line 166. FIG. 5D shows the strip 152 in a folded configuration 194, in which the first attachment line 164 and the second attachment line 166 are attached to each other.

Figure 6B:
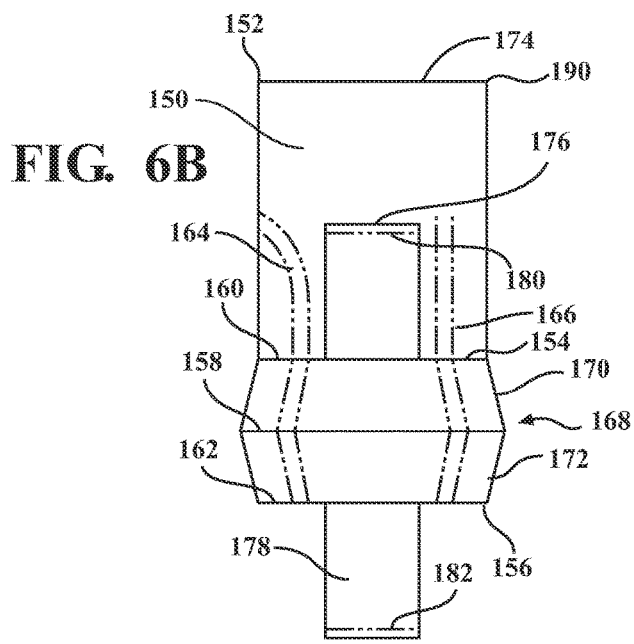
FIG. 6B is an example of the second embodiment of the pocket piece in a first partially folded configuration.
Figure 6C:
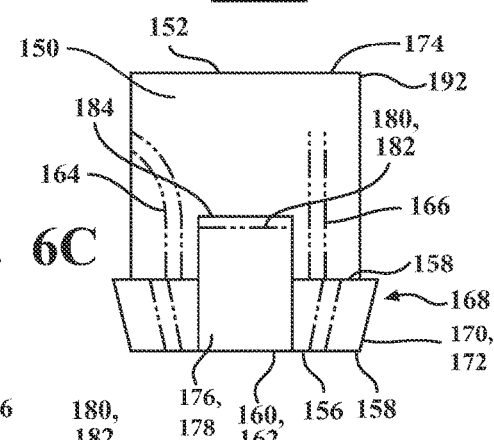
FIG. 6C is an example of the second embodiment of the pocket piece in a second partially folded configuration.
Figure 6D:
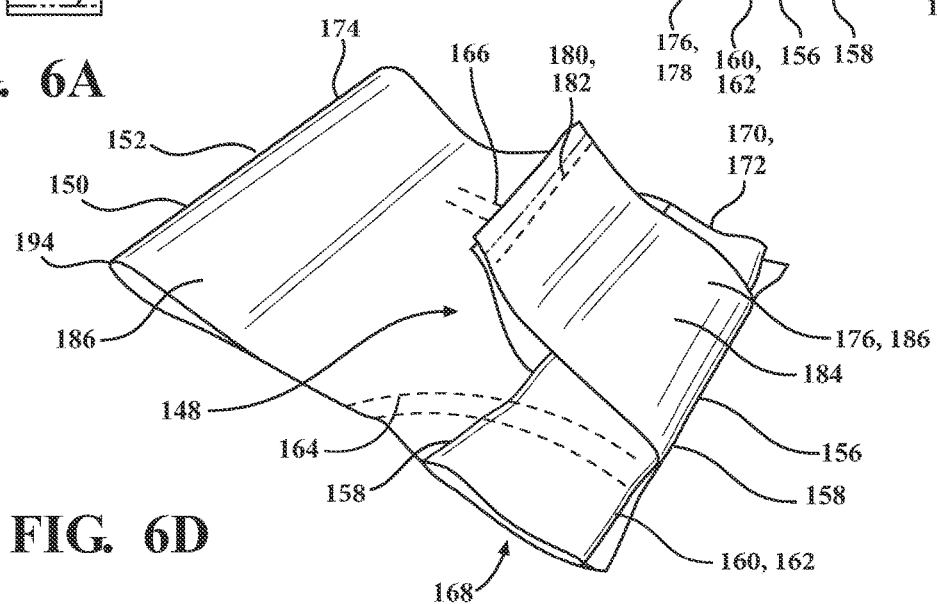
FIG. 6D is an example of the second embodiment of the pocket piece in a folded configuration.

In a second embodiment, shown in FIGS. 6A-6D, the strip 152 may, in addition to the first end 154, the second end 156, the fold lines, the attachment lines, and the projection 168, include a primary fold line 174, first tab 176 at the first end 154, and a second tab 178 at the second end 156. The first tab 176 may include a first tab attachment line 180 and the second tab 178 may include a second tab attachment line 182. In this embodiment, to create the pocket 148, the strip 152 may be folded along the primary fold line 174. FIG. 6B shows the strip 152 in a first partially folded configuration 190 in which the strip 152 is folded along the primary fold line 174. The strip 152 is then folded along the first pocket base fold line 160, the second pocket base fold line 162, and the pocket edge fold line 158 so that the first pocket base fold line 160 and the second pocket base fold line 162 align, the first angled edges 170 and the second angled edges 172 align, the first tab 176 and the second tab 178 align, and the first tab attachment line 180 and the second tab attachment line 182 align. FIG. 6C shows the strip 152 in a second partially folded configuration 192 in which the strip 152 is folded along the first pocket base fold line 160, the second pocket base fold line 162, and the pocket edge fold line 158. After manipulation to align the first attachment line 164 and the second attachment line 166 within the projection 168 with the first attachment line 164 and the second attachment line 166 outside of the projection 168, the strip 152 may then be sewn or otherwise connected at the first attachment line 164 and the second attachment line 166. The first tab attachment line 180 and the second tab attachment line 182 are then attached to create a tab piece 184. FIG. 6D shows the strip 152 in a folded configuration 194 in which the first attachment line 164 and the second attachment line 166 are attached to each other and in which the first tab 176 and the second tab 178 are aligned and attached to form the tab piece 184. The tab piece 184 may be advantageous to the production of the airbag module 100, for example, when assembling the components of the airbag module 100.

In either embodiment, in some instances, the strip 152 may be folded to create the pocket piece 150, sewn along the attachment lines, placed on the airbag 102, and then sewn to the airbag 102. In other instances, the strip 152 may be folded to create the pocket piece 150, placed on the airbag 102, and then sewn to the airbag 102. Moreover, in either embodiment, when the pocket piece 150 is folded to form the pocket 148, the pocket piece 150 may include selvage 186. For example, the pocket piece 150 includes selvage 186 above the pocket 148 such that when the second portion 132 is inserted into the pocket 148, the remainder of it overlies the selvage 186. This may be advantageous to help prevent the second portion 132 from cutting into the material of the airbag 102. The pocket piece 150 can also include selvage 186 on either side of the first attachment line 164 and/or the second attachment line 166. This helps to prevent the pocket piece 150 from becoming disassembled and/or from detaching from the airbag 102. It may also help increase the strength of the attachment of the pocket piece 150 to the airbag 102.

Referring back to FIG. 1, the airbag module 100 is shown in an assembled configuration 196. When the airbag module 100 is in the assembled configuration 196, the second portion 132 is installed to the pocket 148, the inflator 104 is installed to the mounting retainer 106, and the clamp 108 is installed to the mounting retainer 106 between the flanges 142, around the neck 114 and the inflator 104, and over the second portion 132 and the pocket 148. Accordingly, in the assembled configuration 196, the clamp 108 secures the neck 114 and the inflator 104 to the second portion 132 and seals the inflator 104 and the inflation port 112 with one another. Moreover, in the assembled configuration 196, the mounting retainer 106 is mounted to the vehicle, and the airbag 102 and the inflator 104 are mounted to the vehicle together with the mounting retainer 106.

Figure 3B:
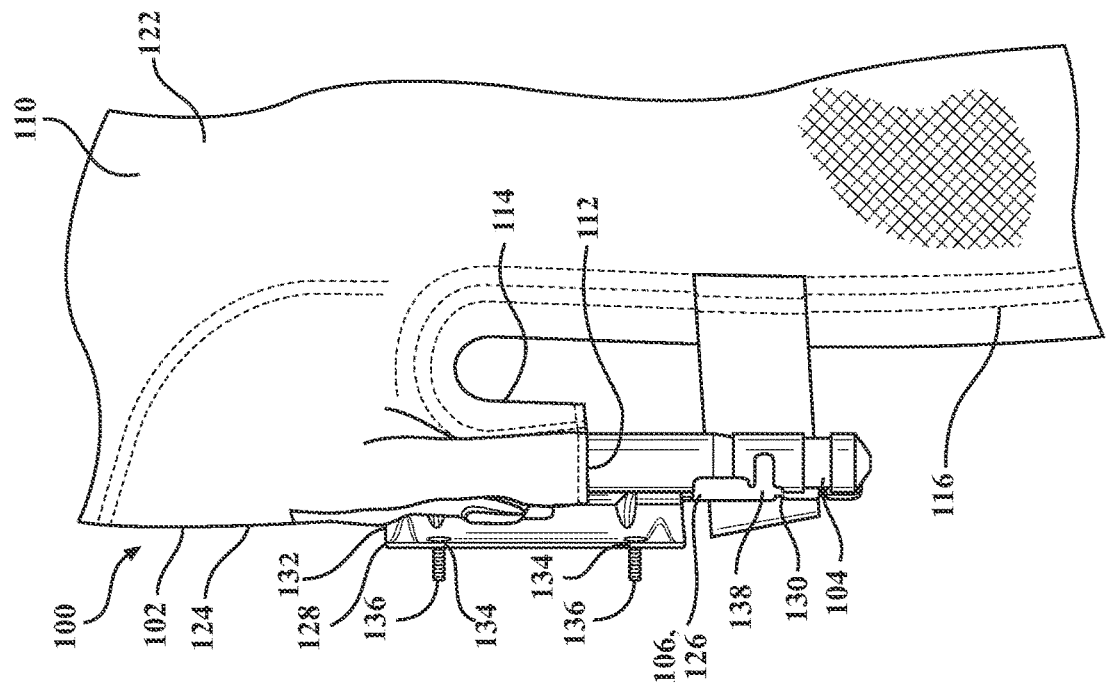
FIG. 3B is a rear view of a portion of the airbag module showing the mounting retainer installed to the pocket and the inflator installed to the mounting retainer.
Figure 3A:
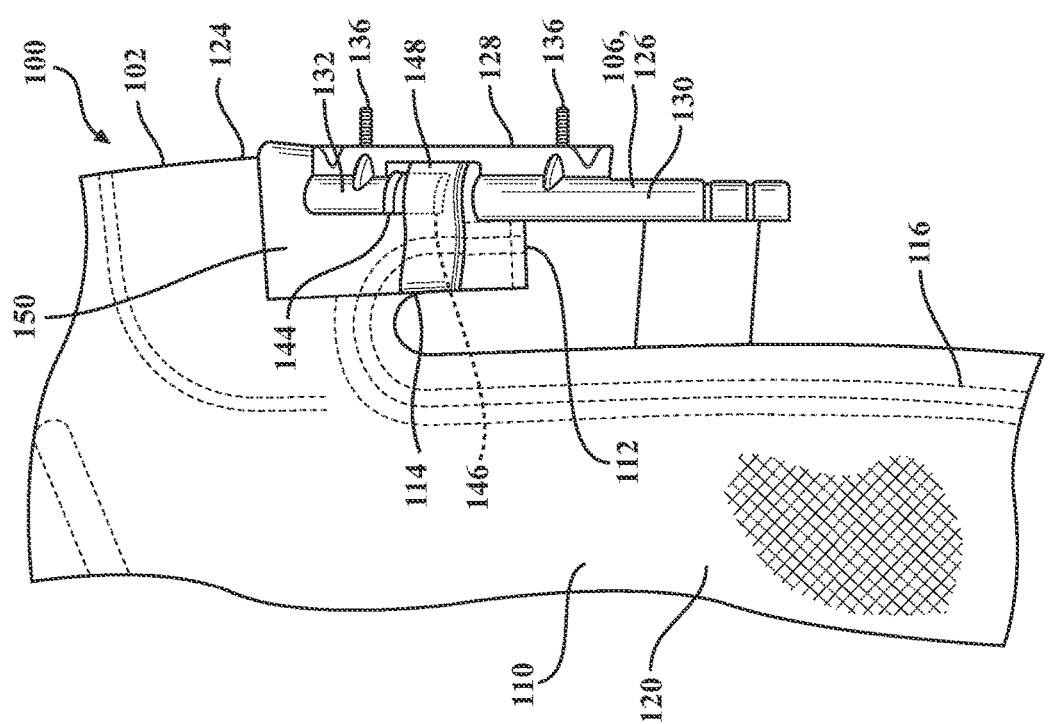
FIG. 3A is a front view of a portion of the airbag module showing the mounting retainer installed to the pocket and the inflator installed to the mounting retainer.

A method of assembling the airbag module 100 will now be described with reference to FIGS. 3A, 3B, 4A, and 4B. Referring back to FIGS. 2A and 2B, the airbag module 100 is shown in a disassembled configuration 198. The airbag module 100 may be assembled by first installing the inflator 104 to the neck 114 and installing the second portion 132 to the pocket 148. FIGS. 3A and 3B show the inflator 104 installed to the neck 114 and the second portion 132 installed to the pocket 148. Next, the clamp 108 may be installed to the neck 114 around the inflator 104, the second portion 132, and the pocket 148. FIGS. 4A and 4B show the clamp 108 installed to the neck 114 around the inflator 104, the second portion 132, and the pocket 148.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An airbag module, comprising:
    an airbag, the airbag including an inflation chamber, an inflation port for the inflation chamber, and a neck that opens into the inflation chamber around the inflation port, the airbag further including a pocket, the pocket located on the neck and opening away from the neck and the inflation port;
    an inflator, the inflator configured to be inserted into the neck and inflate the inflation chamber through the inflation port; and
    a mounting retainer, the mounting retainer configured to be installed to the neck in the pocket, receive and support the inflator, and mount the airbag to a vehicle.

2. The airbag module of claim 1, wherein the mounting retainer includes a body, the body including a first portion and a second portion, the second portion being configured for installation to the pocket.

3. The airbag module of claim 2, wherein the second portion includes a first flange and a second flange, and further comprising a clamp, the clamp configured to secure the inflator, the mounting retainer, and the airbag around the second portion in between the first flange and the second flange.

4. The airbag module of claim 1, wherein the pocket is formed from a pocket piece, and wherein the pocket piece is configured for attachment to the airbag.

5. The airbag module of claim 4, wherein the pocket piece comprises:
    a strip of fabric, the strip defining a first end and a second end opposite the first end and configured to form the pocket piece when folded;
    fold lines, the fold lines extending laterally across the strip and indicating where the strip is folded to create the pocket; and
    attachment lines, the attachment lines extending longitudinally along the strip and indicating where the pocket piece is attached to the airbag.

6. The airbag module of claim 5, wherein the fold lines include a pocket edge fold line, the pocket edge fold line forming a mouth of the pocket when the strip is folded into the pocket piece, the fold lines further including a first pocket base fold line and a second pocket base fold line, the first pocket base fold line and the second pocket base fold line forming a bottom of the pocket when the strip is folded into the pocket piece.

7. The airbag module of claim 6, wherein the pocket piece further includes a projection, the projection located between the first pocket base fold line and the second pocket base fold line and including angled edges, wherein the attachment lines are angled within the projection to follow the angled edges such that when the projection is folded and attached, the projection creates a three-dimensional mouth of the pocket.

8. The airbag module of claim 7, wherein the strip defines a first width, the projection defines a second width, and the second width is wider than the first width.

9. The airbag module of claim 8, wherein the pocket piece further includes a tab piece, the tab piece configured for use by a user when assembling the airbag module.

10. The airbag module of claim 1, wherein the airbag is a far-side airbag.

11. An airbag, comprising:
    an inflation chamber, an inflation port for the inflation chamber, and a neck that opens into the inflation chamber around the inflation port; and
    a pocket formed from a pocket piece, the pocket piece including a strip of fabric configured to form the pocket piece when folded, the pocket located on the neck and opening away from the neck and the inflation port, the pocket configured to receive a mounting retainer for mounting the airbag to a vehicle.

12. The airbag of claim 11, wherein the pocket piece is configured for attachment to the airbag.

13. The airbag of claim 12, wherein the strip of fabric includes:
    a first end and a second end opposite the first end;
    fold lines extending laterally across the strip and indicating where the strip is folded to create the pocket; and
    attachment lines extending longitudinally along the strip and indicating where the pocket piece is attached to the airbag.

14. The airbag of claim 13, wherein the fold lines include a pocket edge fold line, the pocket edge fold line forming a mouth of the pocket when the strip is folded into the pocket piece, the fold lines further including a first pocket base fold line and a second pocket base fold line, the first pocket base fold line and the second pocket base fold line forming a bottom of the pocket when the strip is folded into the pocket piece.

15. The airbag of claim 14, wherein the pocket piece further includes a projection, the projection located between the first pocket base fold line and the second pocket base fold line and including angled edges, wherein the attachment lines are angled within the projection to follow the angled edges such that when the projection is folded and attached, the projection creates a three-dimensional mouth of the pocket.

16. The airbag of claim 15, wherein the strip defines a first width, the projection defines a second width, and the second width is wider than the first width.

17. The airbag of claim 16, wherein the pocket piece further includes a tab piece, the tab piece configured for use by a user when assembling an airbag module including the airbag.

18. The airbag of claim 11, wherein the airbag is a far-side airbag.

19. A method of assembling an airbag module, the airbag module comprising an airbag including an inflation chamber, an inflation port for the inflation chamber, and a neck that opens into the inflation chamber around the inflation port, the airbag further including a pocket located on the neck and opening away from the neck and the inflation port, the airbag module further comprising an inflator configured to be inserted into the neck and inflate the inflation chamber through the inflation port, and the airbag module further comprising a mounting retainer configured to be installed to the neck in the pocket, receive and support the inflator, and mount the airbag to a vehicle, the method comprising:
- installing the inflator to the neck through the inflation port and to the mounting retainer;
- installing the mounting retainer to the pocket; and
- installing a clamp around the inflator, the mounting retainer, and the pocket to secure the airbag to the mounting retainer.

20. The method of claim 19, further comprising:
- installing the mounting retainer to a vehicle seat to mount the airbag module to the vehicle seat.

* * * * *